March 19, 1929.  J. W. STEINMEYER ET AL  1,706,084
CAR TANK HEATER
Filed Nov. 4, 1926   2 Sheets-Sheet 1
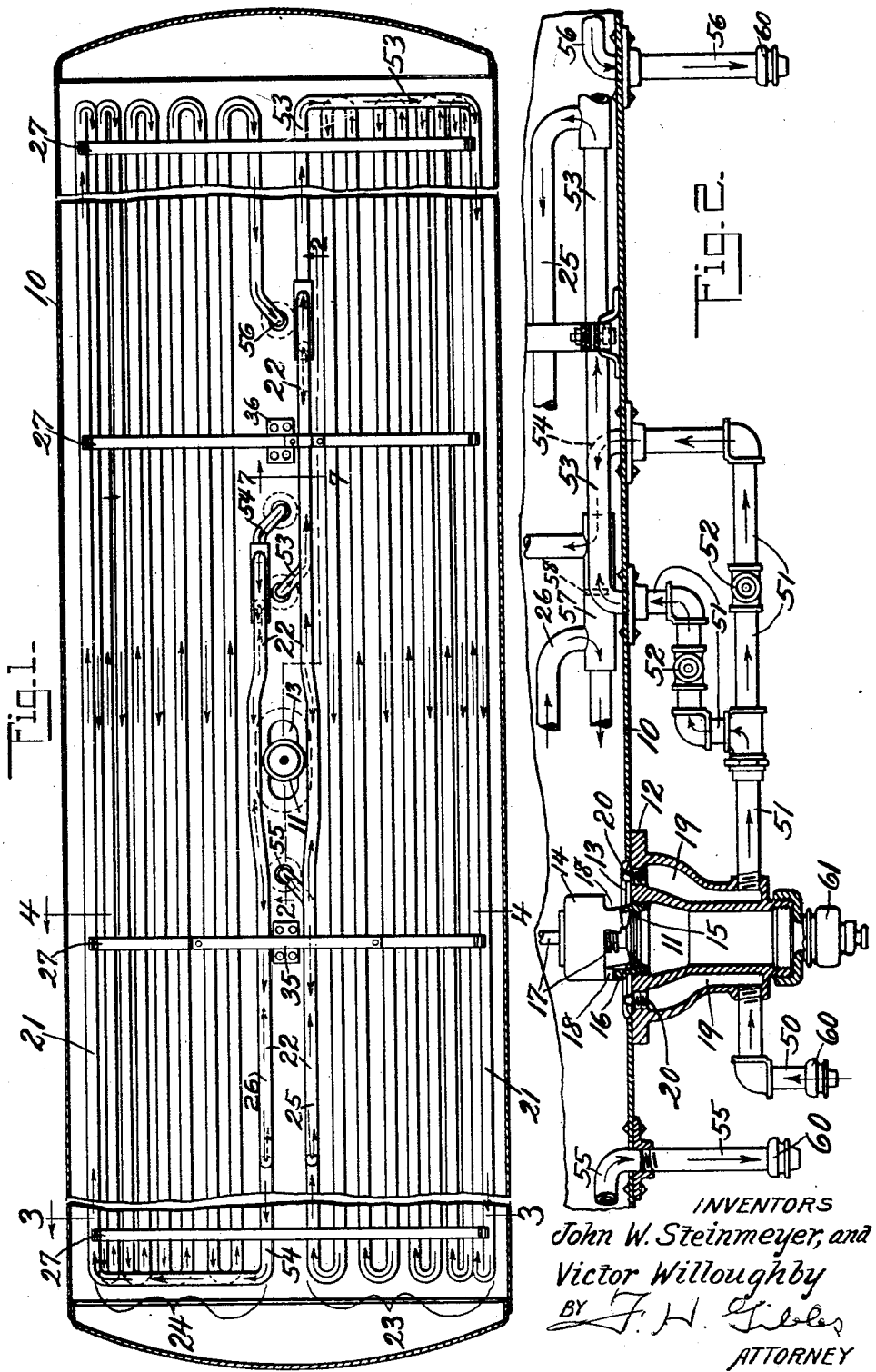
INVENTORS
John W. Steinmeyer, and
Victor Willoughby
BY F. H. Gibbs
ATTORNEY March 19, 1929.   J. W. STEINMEYER ET AL   1,706,084
CAR TANK HEATER
Filed Nov. 4, 1926   2 Sheets-Sheet 2
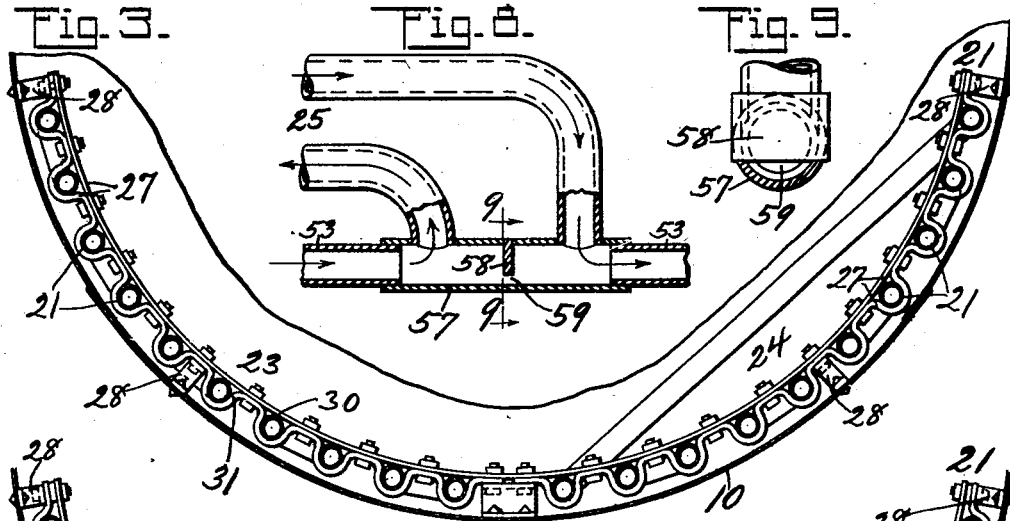
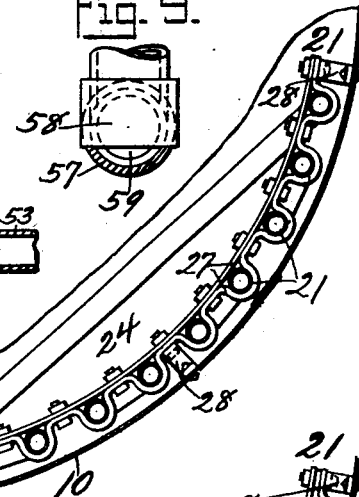
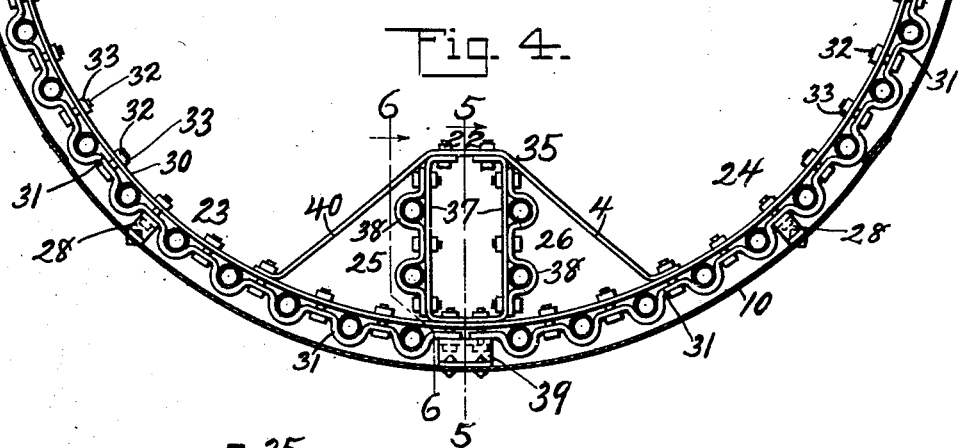
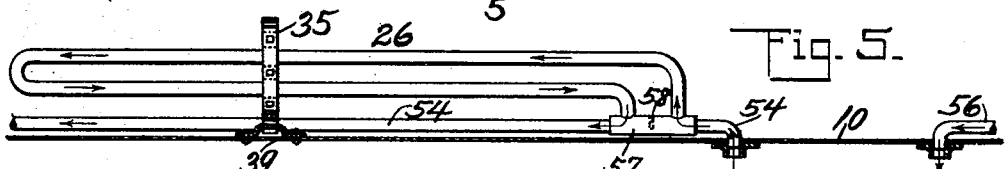
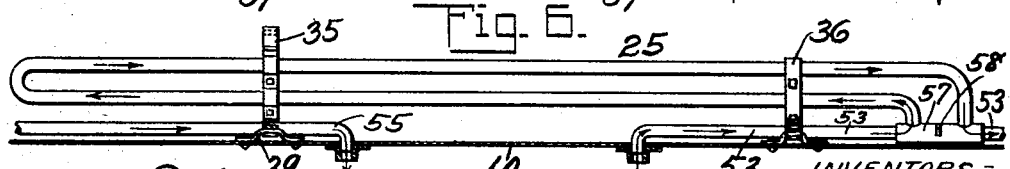
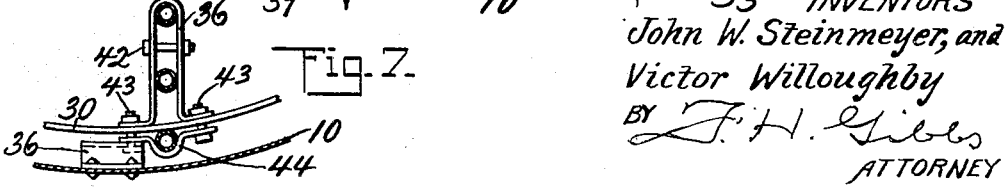
INVENTORS —
John W. Steinmeyer, and
Victor Willoughby
BY F. H. Gibbs
ATTORNEY Patented Mar. 19, 1929.

1,706,084

UNITED STATES PATENT OFFICE.

JOHN W. STEINMEYER, OF EAST ORANGE, AND VICTOR WILLOUGHBY, OF RIDGEWOOD, NEW JERSEY, ASSIGNORS TO AMERICAN CAR AND FOUNDRY COMPANY, OF NEW YORK, N. Y., A CORPORATION OF NEW JERSEY.

CAR-TANK HEATER.

Application filed November 4, 1926. Serial No. 146,213.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In the drawings:

Fig. 1 shows a horizontal section through a railway car tank, with its internal heating provisions and connections in plan,—portions being broken out and omitted to bring the view within the limits of the paper;

Fig. 2 is a fragmentary vertical sectional view, taken as indicated by the line 2—2 in Fig. 1, showing the supply and outlet connections for heating fluid;

Fig. 3 shows a fragmentary transverse section through the lower portion of the tank and the heating pipes or coils therein, taken as indicated by the line 3—3 in Fig. 1;

Fig. 4 shows a similar section, taken as indicated by the line 4—4 in Fig. 1;

Fig. 5 is a fragmentary view of a supplemental or auxiliary heating coil and its connections, with the bottom of the tank and the supporting rack for the coil in section, taken as indicated by the line 5—5 in Fig. 4;

Fig. 6 is a similar view of another auxiliary or supplemental heating coil, taken as indicated by the line 6—6 in Fig. 4;

Fig. 7 is a fragmentary sectional view illustrating the mounting of an auxiliary heating coil, taken as indicated by the line 7—7 in Fig. 1;

Fig. 8 is a fragmentary view, partly in longitudinal vertical section, illustrating the supply and outlet connections of one of the auxiliary coils;

Fig. 9 is a fragmentary sectional view, taken as indicated by the line 9—9 in Fig. 8.

This invention relates to railway car tanks and the like, and is especially concerned with provisions for heating their contents in order to liquefy them or render them more freely fluid. This is particularly necessary or desirable in the case of various bituminous materials, such as asphalts and heavy petroleum products. Such materials are loaded into tank cars while heated to a molten or freely fluid state, and must likewise be heated when it is desired to discharge them from the cars. The aim of this invention is to provide simple and efficient means for this purpose, relatively easy and economical to manufacture and install, and convenient and effective in use.

The drawing shows a railway car tank shell 10, provided with a central bottom outlet 11 (Figs. 1 and 2) for the discharge of its contents, and also with means for heating the contents of the tank 10 and the outlet 11. The outlet structure at 11 comprises a double walled casting with a top flange 12 riveted over an opening 13 in the tank shell 10, and a valve cage 14 screwed into the upper end of the outlet 11 and affording a seat 15 for a disc valve 16 which may be opened and closed by rotation of a threaded stem 17. Lateral openings or ports 18 in the wall of the cage 14 afford passage for the fluid contents of the tank 10 to the valve 16, and through the seat opening 15 and the outlet 11. The double wall of the outlet casting 11 affords a jacket space 19 for a heating medium to heat the outlet. Cleanout holes opening into the interior of the tank shell 10 may be provided for the jacket 19, and may normally be closed by screw plugs 20.

The main heating means 21 for the contents of the tank 10 (Figs. 1, 3 and 4) is arranged within the latter, consisting of a peripheral series of longitudinal pipe lengths ranging upward at either side of the outlet 11, as close as possible to the shell. In addition, there are auxiliary or supplemental heating means 22 for the central longitudinal region of the tank, consisting of vertical series of longitudinal pipe lengths ranging upward above the main heating means 21 at either side of the outlet 11. (Figs. 1 and 4.) In the present instance, the main and auxiliary heating means 21, 22 are both divided into separate units or sections (23, 24 and 25, 26), arranged at opposite sides of the tank outlet 11, and connected in parallel for passage of the heating medium,—usually steam. (See Figs. 1, 2, 5 and 6.) The pipe lengths forming the main heating units 23, 24 are serially connected by U-bends at opposite ends alternately, so that the fluid zig-zags back and forth along and "across" each unit, lengthwise and circumferentially of the tank 10. The auxiliary units 25, 26 have only two pipe lengths each, which are serially connected by a U-bend so that the fluid makes one double pass back and forth along and across each such unit, lengthwise and vertically of the central region of the tank 10.

The pipe lengths of both main heater units 23, 24 may be supported in the outer peripheral region of the tank 10 by means of circumferential racks or frames 27, shown as attached to the tank shell at suitable intervals by brackets 28 riveted to the tank shell and bolted to the racks. As shown in Figs. 3 and 4, each of these racks 27 may consist of an inner plain curved bar or strap 30 above the pipes and a sinuous lower bar or strap 31 below them, bent in conformity to the curvature of the pipes so as to afford semi-circular seats or sockets for holding them and spacing them apart. In the present instance, the sinuous bars 31 are divided at the center of the tank. They are secured to the plain bars 30 to clamp the pipes against the latter by means of bolts 32, in the intervals between adjacent pipes. These bolts 32 are here shown with their nuts 33 at the inner sides of the plain bars 30, where they are readily accessible, and with their heads at the outer sides of the zigzag bars 31, between the pipe seats of the latter. The space between the substantially straight portions of the zigzag bars and the tank shell is sufficient to permit the bolts 32 to be withdrawn after removal of their nuts 33.

As shown in Figs. 1, 2 and 4-6, the pipe lengths of the auxiliary heaters 25, 26 are supported by a couple of suitably spaced racks or frames 35, 36, very similar in construction to the racks 27 for the main heaters 23, 24. The rack 35 in the left-hand end of the tank 10 (Fig. 1) consists of a rectangularly bent plain bar 37 with a sinuous bar 38 bolted to either side thereof. The lower portion of the bar 37 is bolted to the central portion of the main rack 27 and to a U clip 39 beneath the latter, whose ends are riveted to the tank shell 10. The upper end of the auxiliary rack is braced by struts 40 extending and bolted to the main rack 27 some distance to either side. These struts 40 are formed by a single bar bent over the upper end of the rack 35 and fastened thereto. The rack 36 in the right-hand end of the tank 10 (Fig. 1), where only the front heater 25 extends, has the form of an inverted U-shaped strap or stirrup clamped on the pipes by a bolt 42 between them. The ends of this strap are secured to the plain bar 30 of the main rack 27 by the bolts 43 which secure thereto a clip 44 supporting one of the pipes for the corresponding main heater 23.

As shown in Figs. 1 and 2, the steam from the supply connection 50 passes first through the jacket 19 of the outlet casting 11, on its way to the heating coils inside the tank 10. This arrangement results in the outlet 11 being first of all heated effectually, so as to free it of any material that may have solidified in it when the car was last used, and to loosen the valve 16 and permit it to be readily opened. Leaving the jacket 19 at the side opposite its point of entrance, the steam passes on through the branching connections 51, 51 (with their valves 52, 52) and through the tank shell 10 to the longitudinal heater connections 53, 54 inside the tank at either side of the outlet 11. The comparatively fresh steam from these connections 53, 54 passes directly into and through the central auxiliary heaters 25, 26, respectively, in parallel, so as first to liquefy the material in the central lower region of the tank and form a longitudinal channel of freely fluid material extending to either side of the outlet 11. Steam returning to the longitudinal connections 53, 54 from the auxiliary heaters 25, 26 (or traversing these connections without entering the auxiliary heaters) passes outward at the ends of the tank 10 to the outermost and uppermost lengths or convolutions of the main heating coils 23, 24, and thence downward and inward through their successive lengths to central discharge connections 55, 56 in the opposite tank ends. Thus the material in the bottom of the tank 10 next its shell is kept freely fluid, so that as the superincumbent solid mass of material continually gravitates or drops on the peripheral heating pipes and is melted by them, the liquid may have a chance to circulate downward and inward along the tank shell to the central channel above mentioned and be discharged at the outlet 11,—without having first to rise to the top of the tank in order to find its way to the outlet, as in some constructions heretofore suggested. As shown in Figs. 1, 2, 5, 6 and 8, each of the auxiliary heating coils 25, 26 is connected in parallel with one of the supply connections 53, 54 (as above intimated) at different points in the length of a fitting 57 interposed therein, so that the auxiliary coil is in parallel with the length of fitting between such points. In order to cause a flow of steam through these auxiliary coils 25, 26 notwithstanding the direct "by-pass" connection through the fitting 57, this by-pass may be checked, as by a baffle or septum 58 (Figs. 2, 5, 6, 8, and 9) extending across all but the lower portion of the passage, so as to leave only relatively small direct passage 59 in the lower portion of the fitting below the baffle. This will allow water to drain freely and directly from the piping while causing a flow of steam through the auxiliary coils.

As shown in Fig. 2, removable protective caps 60 may be provided for the ends of the steam supply and discharge connections 50 and 55, 56 exposed below the tank shell 10, as well as a removable closure 61 for the tank outlet 11. These serve to prevent damage or fouling of the connections by stones or dirt thrown up from the road bed when the car is in transit.

What is claimed is:

1. The combination with a car tank and a jacketed discharge outlet therefor, of heating means for the bottom peripheral region of the tank, local heating means for a longitudinally and vertically extended central region above the discharge outlet, and means for passing heating medium serially through the outlet jacket and said central and peripheral heating means, in the order named.

2. In combination with a car tank, of a heater for its peripheral region comprising longitudinal pipes and a circumferential supporting rack therefor, and a local heater for the central region of the tank comprising longitudinal heating pipes and a supporting rack therefor mounted on said circumferential rack.

3. The combination with a car tank of a steam heater for its peripheral region comprising a plurality of longitudinal pipes, and a heater for the central region of the tank above said peripheral heater, with supply and outlet connections to one of said longitudinal pipes at different points in its length and means for choking the upper portion of the main pipe connection between said supply and outlet connections, so as to cause flow of steam through the heater served by them while permitting drainage of water past them.

4. The combination with a car tank and its discharge opening of heating elements for the peripheral region of the tank, and series of vertically and longitudinally arranged heating elements connected therewith and from which the heating medium passes to said first named heating elements.

5. The combination with a car tank and its discharge opening of series of heating elements for the peripheral region of the tank, and a series of vertically and longitudinally arranged heating elements connected with each series of the first named heating elements and from which the heating medium passes to said first named heating elements.

6. In a car tank, heating means for the contents thereof comprising series of peripherally arranged heating elements and a vertically arranged series of longitudinally extending heating elements connected with each series of peripherally arranged heating elements.

7. In a car tank, heating means for the contents thereof comprising series of peripherally arranged heating elements and a series of vertically arranged longitudinally extending heating elements connected with each series of peripherally arranged heating elements and extending upwardly into the tank to maintain a longitudinally extending discharge channel.

8. In a car tank having a discharge opening, means for heating the contents of the tank comprising, in combination, a jacketed discharge outlet, heating elements longitudinally and vertically arranged in the tank adjacent the discharge opening, means connecting said discharge outlet and heating elements to transmit a heating medium from the former to the latter, and other heating elements connected to said first named heating elements and receiving the heating medium therefrom.

9. In a car tank having a discharge outlet, a series of connected heating elements at the bottom of the tank and extending vertically upward thereinto on each side of the discharge outlet, and a series of peripherally arranged heating elements adjacent the sides of the tank. each of said second named series being connected to one of the first named series at the upper element of said second named series.

10. The combination with a car tank of opposed series of heating pipes for the peripheral region of the tank and a supporting rack therefor, and series of local heating pipes for the central region of the tank and a supporting rack therefor mounted on the first named supporting rack.

11. The combination with a car tank of opposed series of heating pipes for the peripheral region of the tank and a supporting rack therefor, and a series of local heating pipes for the central region of the tank connected to each of the opposed series, and a supporting rack therefor mounted on the first named supporting rack.

12. The combination with a car tank of opposed series of heating pipes for the peripheral region of the tank, a supporting rack therefor, a series of local heating pipes for the central region of the tank connected to each of the opposed series, and brackets for supporting said local heating pipes.

13. In a car tank means for heating the central region thereof comprising a plurality of vertically arranged series of longitudinally extending heating pipes.

14. In a car tank means for heating the central region thereof comprising a plurailty of vertically arranged series of longitudinally extending heating pipes and spaced brackets supporting said pipes.

15. In a car tank means for heating the central region thereof comprising a plurality of vertically arranged series of longitudinally extending heating pipes, spaced brackets secured to the tank adjacent the pipes, and means secured to the brackets for supporting the pipes.

16. In a car tank means for heating the central region of the tank to define a longitudinally and vertically extending heated area, comprising vertically arranged series of longitudinally extending heating pipes and brackets for supporting said pipes, each of said brackets engaging each series of heating pipes.

In witness whereof we have hereunto set our hands.

JOHN W. STEINMEYER.
VICTOR WILLOUGHBY.